United States Patent Office 3,340,245
Patented Sept. 5, 1967

3,340,245
CROSSLINKING OF POLYMERS
Zalik Oser, Falls Church, Va., and Edward J. Woelfel, New Brunswick, and Robert Fuhrmann, Morristown, N.J., assignors to Allied Chemical Corporation, New York, N.Y., a corporation of New York
No Drawing. Filed July 24, 1964, Ser. No. 385,075
10 Claims. (Cl. 260—94.9)

This invention relates to the crosslinking of halogen-containing olefin polymers, more particularly to the crosslinking after the shaping thereof.

In a large number of applications of halogen-containing olefin polymers, physical properties, such as high flexibility and elastomeric behavior, better power impact and load absorption characteristics, resistance to the effects of heat including the dimensional stability, resistance to effects of light, grease, oil and solvents, as well as resistance to abrasion and pressure are desired of the material. The best known method for improving the above physical properties of halogen-containing olefin polymers is accomplished by crosslinking the polymer chains of these materials. Crosslinking is the chemical process believed to occur in so-called vulcanizing or curing operations. Crosslinking of polymers is generally accomplished by adding a crosslinking agent to the polymer formulation. In many instances some sort of promoter of crosslinking or curing is also used. The crosslinking agent, in conjunction with promoters if used, forms a bridging bond between adjacent polymers chains.

In the usual crosslinking processes, the crosslinking agent is incorporated into the polymer before the shaping thereof. Exposure to elevated temperatures sets the crosslinking mechanism into motion. In case of extrusion, since crosslinking would occur practically simultaneously with the extrusion process, careful control of the process and an effort to compete the shaping before the crosslinking occurs are required, so as to avoid crosslinking or setting up the polymer while still in the extruder. This difficulty generally has tended to prevent widespread application of extrusion techniques to materials to be crosslinked.

In accordance with the present invention a process is provided for crosslinking halogen-containing olefin polymers, whereby the polymer is contacted by gaseous $BF_3$, preferably at an elevated temperature.

Types of halogen-containing olefin polymers which can be crosslinked in accordance with the invention include halo-ethylene polymers such as polyvinyl chloride, polyvinylidene chloride, fluoroethylene polymers, trifluorochloroethylene, and chlorinated polyethylene; neoprene, and the like, both homo- and copolymers.

In practicing the present invention, the gas treatment can be carried out at a temperature of about 25–160° C., with the preferred temperature range being about 50° to 120° C. It is an advantageous feature of the invention that, contrary to general practice of crosslinking, no promoter is necessary in carrying out the process.

In the process of this invention the polymer first goes through an initial period of incipient crosslinking in which the extent of crosslinking is not sufficient to produce any insoluble material, but the intrinsic viscosity is substantially increased. As the crosslinking proceeds, gel insoluble in refluxing monochlorobenzene, hereinafter designated as "insoluble gel," is progressively formed. The quantity of insoluble gel is indicative of and proportionate to the extent of crosslinking. This relationship is described in greater detail, for example, in Industrial and Engineering Chemistry, 1946, p. 417; and 1947, p. 1339. Although it is preferred to continue the crosslinking process until the polymer contains at least 5% by weight of this insoluble gel, some improvement in the heat resistance of the polymer is already achieved in the incipient crosslinking period after the intrinsic viscosity of the polymer has increased by at least about 50%.

The preferred halogen-containing polyolefin in connection with which the crosslinking method of the present invention is used, is essentially amorphous chlorinated polyethylene. This material can contain from about 20 to 80% by weight chloride. Particularly suitable polyethylenes to be chlorinated for use in our invention are those produced as described in Example 6 of British Patent No. 858,674 to Allied Chemical Corporation. Such polyethylenes can be chlorinated with advantage for use in the present invention by the process described in Example 3 of French Patent No. 1,316,044 to Allied Chemical Corporation. Alternatively, the chlorination can be effected by the process of Eckardt et al. U.S. application Ser. No. 354,345 filed Mar. 24, 1964.

The polymerization process of British Patent No. 858-,674 results generally in a polymer of high molecular weight such as 500,000 to 5,000,000 average molecular weight, as calculated from measurement of solution viscosity, suitable for chlorination by the method of French Patent 1,316,044. The molecular weight of the polyethylene can be reduced by a thermal treatment, for instance in accordance with the process outlined on page 12, lines 73–77 of the above-identified British Patent No. 858,674. The molecular weight of the resulting polyethylenes will be in the range of about 20,000 to 300,000. These lower molecular weight polymers are advantageously chlorinated in accordance with the above-cited Eckardt et al. application Ser. No. 254,345.

The following examples described specific embodiments of the invention and illustrate the best mode contemplated by us of carrying it out, but are not to be interpreted as limiting the invention to all details of the examples.

The concentration of the crosslinked polymer obtained in accordance with our invention is expressed as the percentage by weight of insoluble gel in the total polymer. The higher the insoluble gel concentration, the more the crosslinking of the polymer.

About 0.2 to 0.3 gram of the polymer treated in accordance with the invention were weighed into a tared stainless steel basket made of 250 mesh screen. This basket was placed in a Soxhlet extractor containing approximately 125 ml. monochlorobenzene, and refluxed for six hours. The soluble fraction of the product was thus extracted, permitting gravimetric determination of the insoluble gel which remained in the basket. During the extraction the system was kept under slow $N_2$ stream to prevent oxidation. The polymer contained substantially no insoluble gel before being treated with $BF_3$ in accordance with the invention.

*Example I*

Powdered chlorinated polyethylene having a chlorine content of 60% by weight and an intrinsic viscosity of 3.42 deciliters per gram in o-dichlorobenzene at 100° C., was placed into a U-shaped tube. The tube with the sample therein was heated to 110° C. in an oil bath and gaseous $BF_3$ was fed through the polymer for a period of 4 hours, at the rate of 0.5 gram per minute. The tube was then purged with nitrogen and the treated chlorinated polyethylene was removed. It was found to have an insoluble gel content of 50.5% by weight.

*Example II*

The process of Example I was repeated, this time on a powdered chlorinated polyethylene sample containing 70% by weight chlorine, and having an intrinsic viscosity of 2.76 deciliters per gram. The period of exposure to gaseous $BF_3$ was ½ hour at a gas feed rate of 0.5 gram per minute. The treated sample was found to have 40.4% by weight insoluble gel.

*Example III*

The process of Example I was repeated using the same powdered chlorinated polyethylene, but lowering the reaction temperature to 50° C. The period of exposure to $BF_3$ was ½ hour at a gas feed rate of 0.5 gram per minute. The treated sample contained no insoluble gel, but the intrinsic viscosity had increased from 3.42 to 13.65 deciliters per gram in o-dichlorobenzene at 100° C.

*Example IV*

200 parts by weight of chlorinated polyethylene having a chlorine content of 64.3% by weight and an intrinsic viscosity of 2.53, were milled for 7 minutes at 130° C. with 93 parts by weight liquid chlorinated paraffin containing 40% by weight combined chlorine, as a plasticizer and flame retardant. The resulting blend was extruded at 150° C. into a filament of a diameter of approximately 0.5 mm. The filament was exposed to gaseous $BF_3$ in a closed vessel at a temperature of 90–110° C. for 1.75 hrs. at a $BF_3$ partial pressure of 760 mm. Hg. The thus treated filament was found to have 12.6% insoluble gel.

*Example V*

A 0.25 mm. thick film of chlorinated polyethylene having a chlorine content of 64% by weight and an intrinsic viscosity of 2.53 deciliters per gram, was cast from a solution of the polymer in tetrahydrofuran. The film was subjected at 90–110° C. to contact with gaseous $BF_3$ for 2 hours, at a rate of 1 gram per minute. After treatment the film was found to have 50.4% insoluble gel.

We claim:
1. A process for crosslinking halogen-containing olefin polymers, which comprises contacting the polymer with gaseous $BF_3$.
2. The process of claim 1, wherein said contacting is conducted at a temperature between 25° C. and 160° C.
3. The process of claim 1, wherein the polymer is an article shaped by extrusion.
4. The process of claim 1, wherein said polymer is contacted with gaseous $BF_3$ until the intrinsic viscosity of the polymer has increased by at least 50%.
5. The process of claim 1, wherein said polymer is contacted with gaseous $BF_3$ until said polymer contains at least 5% by weight of an insoluble gel.
6. The process of claim 2, wherein the halogen is chlorine, and the polymer is a polymer of ethylene.
7. The process of claim 6, wherein the polymer is chlorinated polyethylene containing between 20 and 80% by weight chlorine.
8. A process for crosslinking a filament essentially consisting of chlorinated polyethylene containing between 20 and 80% by weight chlorine, which comprises contacting the filament with gaseous $BF_3$ at an elevated temperature.
9. A process for crosslinking a film essentially consisting of chlorinated polyethylene containing between 20 and 80% by weight chlorine, which comprises contacting the film with gaseous $BF_3$ at an elevated temperature.
10. An article shaped by extrusion of chlorinated polyethylene which contains 20–80% by weight chlorine, said article having been contacted with gaseous $BF_3$ subsequent to the extrusion, said article having an insoluble gel content of at least 5% by weight.

References Cited

UNITED STATES PATENTS 2,561,814    7/1951    Novotny et al. _____ 260—94.9

JOSEPH L. SCHOFER, *Primary Examiner.*

L. EDELMAN, *Assistant Examiner.*